United States Patent [19]

Lundgren

[11] Patent Number: 4,775,356
[45] Date of Patent: Oct. 4, 1988

[54] DRIVE BELT AND METHOD OF MANUFACTURING SUCH

[75] Inventor: Bengt Lundgren, Uddevalla, Sweden

[73] Assignee: AB SKF, Goteborg, Sweden

[21] Appl. No.: 888,582

[22] Filed: Jul. 21, 1986

[51] Int. Cl.⁴ .............................................. F16G 1/26
[52] U.S. Cl. .................................... 474/201; 474/242
[58] Field of Search ............... 474/201, 238, 239, 240, 474/242, 265

[56] References Cited

U.S. PATENT DOCUMENTS

| | | | |
|---|---|---|---|
| 811,794 | 2/1906 | Riddell | 474/201 |
| 3,720,113 | 3/1973 | Van Doorne et al. | 474/242 |
| 3,808,901 | 5/1974 | Berg | 474/265 X |
| 4,051,740 | 10/1977 | Narang | 474/242 |
| 4,332,575 | 6/1982 | Hendriks | 474/201 |

FOREIGN PATENT DOCUMENTS 0109748 6/1983 Japan .................................. 474/201
0006450 1/1984 Japan .................................. 474/201

Primary Examiner—Stephen J. Novosad
Assistant Examiner—William P. Neuder
Attorney, Agent, or Firm—Eugene E. Renz, Jr.

[57] ABSTRACT

A drive belt for use in e.g. continuously variable transmissions consists of a number of U-shaped segments of e.g. steel having diverging shanks, the outer portions of which being folded around a wire or a band which keeps the segments together. The segments are made of wire and are manufactured by winding a wire helically on a template and cutting the wound wire structure longitudinally into two elongated parts consisting of a row of wire segments which are kept together by any suitable means. The belt is completed by winding a wire or band longitudinally around each elongated part and folding the outer portions of the shanks of the segments around the wire or band.

7 Claims, 1 Drawing Sheet

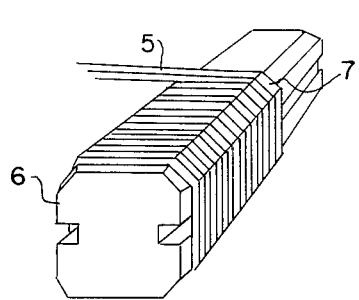
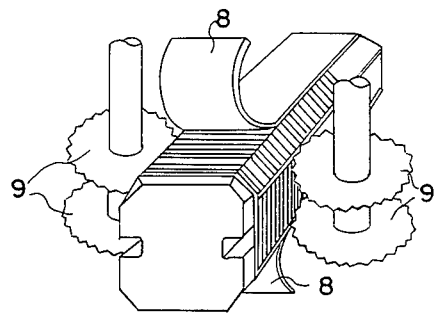
FIG. 1　　　　FIG. 2
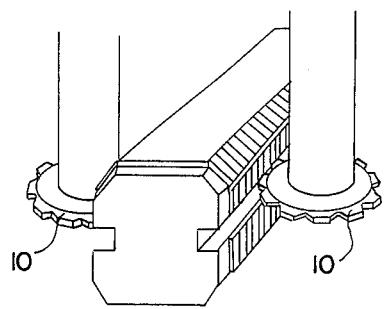
FIG. 3
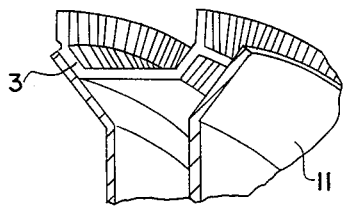　　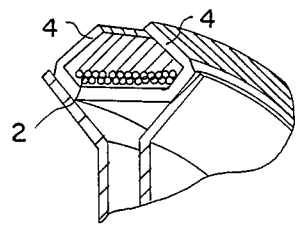
FIG. 4　　　　FIG. 5
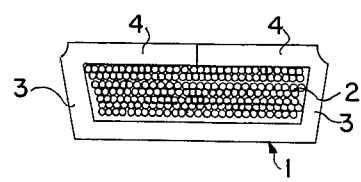
FIG. 6

DRIVE BELT AND METHOD OF MANUFACTURING SUCH

The invention relates to a drive belt of the kind stated in claim 1, and a method of manufacturing such a drive belt.

A drive belt according to the invention is primarily intended for use in a power transmission with a variable gear ratio, comprising two pulleys with variable width and a V-shaped belt with a constant cross section shape arranged between the pulleys. In such devices it is common practice to use drive belts made of a plurality of segments in the shape of sheet metal elements of hardened steel, which segments are arranged in a row one after the other and kept together as a flexible closed belt by flexible bands provided in recesses in the segments. Such a belt is difficult and expensive to manufacture because the shape and measure tolerances of the segments must be very narrow in order for the belt to operate properly, e.g. so that all of the segments situated in the grooves of the pulleys are equally loaded when they are squeezed between the groove walls.

One purpose of the invention is to provide a drive belt of the kind mentioned above, which operates properly under the stated conditions and which can be manufactured easier and less expensive than previously known devices. According to the invention this is achieved by giving the drive belt the characterizing features stated in claim 1. Another purpose of the invention is to provide a method of manufacturing a drive belt of this kind, and such a method is defined in claim 7.

A drive belt according to the invention can be made of a comparatively inexpensive starting material, and manufacture is quick and does not require any complicated and expensive equipment when the method according to the invention is used.

The following is a detailed description with reference to the accompanying drawing, in which:

FIGS. 1-5 show different steps of manufacture for a drive belt according to one embodiment of the invention; and FIG. 6 shows a cross section of such a drive belt.

In the cross section of FIG. 6 there is shown a number of rigid segments 1 arranged closely one after the other and mutually movable so that the drive belt which is formed by the segments can be bent with various radii of curvature. The segments are jointed to each other into a belt by flexible bands or, as shown in the figure, wires 2, which extend perpendicular to the plane of the figure. Each segment is a substantially U-shaped element with diverging shanks 3 which constitute the wedge shape of the belt and are intended for contacting corresponding flange surfaces on pulleys co-operating with the belt for transmitting a torque. The outer portions 4 of the shanks are folded towards each other, whereby the wires 2 are surrounded by the parts of the segment 1. The wires 2 can be more than one or there can be a single wire which is wound along the belt. In order to give the belt a desired rigidity so that it can sustain pressure from the sides, the outer ends of the portions 4 are suitably connected to each other so that they can transmit pressure. The joints can be welds or folds or possibly only a pressing together of the ends of the portions 4. The rigidity can be improved by completely filling the space inside the segments with band or wire material, whereby also the wire or the band can take up pressure sideways. In order to permit the relative sliding which occurs between the different bands or wire loops when the drive belt operates and each cross section alternately is a part of a straight and a bent portion of the belt, the wire can be resilient and flexible, e.g. by being corrugated, twined or helical. In case a band is used instead of a wire, the band can be waved for the same purpose. The wire or band can be made of steel or a high-strength organic material. A reinforced tape may be used as a winding. In order to provide as large a wire cross section surface as possible within the space surrounded by the segment 1, the wire can have a rectangular cross section, which gives the belt the highest possible strength and resistance to deformation. The segments 1 have wire as starting material and are thus formed of wire portions. The segments can be connected to each other in the best possible way and the belt surfaces which take up the pressure from the pulleys have the most suitable shape if the wire has a substantially rectangular cross section.

A drive belt according to the invention is manufactured in a very suitable way using a wire as a starting material. According to the invention a wire 5 (FIG. 1) is wound closely around a template 6 with a cross section shape which is symmetrical in relation to a horizontal central plane and so that each turn of the wire 5 forms a rhomb with chamfered corners 7. A wire 5 with a rectangular cross section thereby gives the wound wire structure the smoothest possible outer surface. After the winding procedure means, e.g. adhesive tapes 8 (FIG. 2), for keeping the wire loops together, are affixed to the wire on each side of the symmetry plane of the template. Indentations for folding of the wire are made by a milling tool 9 or in any suitable way along four edges on the wire structure in pairs on each side of the symmetry plane. Thereafter the wire structure is cut in the symmetry plane, e.g. by a cutting tool 10 (FIG. 3), into two elongated parts, each consisting of a number of U-shaped wire portions arranged one after the other and forming the above mentioned segments. The segments are provisionally kept together by the tapes 8 or other means used for this purpose. Each elongated part is then formed into a closed ring with the shanks of the segments directed radially outwards. The ring is suitably fixed in a winding tool.

FIG. 4 shows a cut detail including a number of segments with shanks 3 and a portion of the tool 11. A wire 2 (FIG. 5) or possibly a band of a flexible material is wound around the ring formed of the segments between the shanks of the segments, and the outer portions 4 of the shanks are folded towards each other so that the wire 2 or the band is enclosed by the originally U-shaped segments. The outer ends of the portions 4 are then suitably jointed, e.g. by welding, so that each segment forms a closed ring around the winding 2. The completed drive belt is thereby totally self-contained, and the possibly used tapes 8 can be removed. If the segments are made of hardenable steel, the outsides of the shanks 3 (FIG. 6) may be e.g. induction hardened for improving the wear resistance of the belt.

What is claimed is:

1. A drive belt comprising a number of individually rigid segments (1) which are supported in an endless path to form a closed belt by flexible bands (2) characterized in that each rigid segment (1) is a bent substantially U-shaped wire portion having outwardly diverging shanks (3) and outer parts (4) which are folded towards each other and secured at their confronting terminal ends, whereby the band or wire is enclosed by the parts of the segment, said rigid segment being of substantially uniform rectangular transverse cross section anywhere along this length.

2. A drive belt comprising a number of individually rigid segments (1) which are supported in an endless path to form a closed belt of flexible bands (2) characterized in that each rigid segment (1) is a bent substantially U-shaped wire portion having outwardly diverging shanks (3) and outer parts (4) which are folded towards each other and have confronting almost abutting terminal ends, whereby the band or wire is completely encapsulated by the parts of the segment, said rigid segments being of substantially uniform rectangular transverse cross section anywhere along this length.

3. A drive belt according to claim 2, in which the outer ends of the folded parts (4) of the shanks of each segment are connected to each other.

4. A drive belt according to claim 2, in which band or wire material fills up the whole space surrounded by each segment (1).

5. A drive belt according to claim 2, in which the wire or band is resilient.

6. A drive belt according to claim 2, in which the wire portions of the segments have a substantially rectangular cross section.

7. A drive belt according to claim 2, in which the segments are jointed by a wire with a substantially rectangular cross section

* * * * *

UNITED STATES PATENT AND TRADEMARK OFFICE
CERTIFICATE OF CORRECTION

PATENT NO. : 4,775,356

DATED : October 4, 1988

INVENTOR(S) : Lundgren

It is certified that error appears in the above-identified patent and that said Letters Patent is hereby corrected as shown below:

Title page, Item [30] should be added as follows:

Foreign Application Priority Data

August 6, 1985 [SE] Sweden ........ 8503713-3

Signed and Sealed this

Twenty-seventh Day of June, 1989

*Attest:*

DONALD J. QUIGG

*Attesting Officer*  *Commissioner of Patents and Trademarks*